(No Model.)
W. P. BECKWITH.
CEMENT SIDEWALK.
No. 586,540. Patented July 20, 1897.
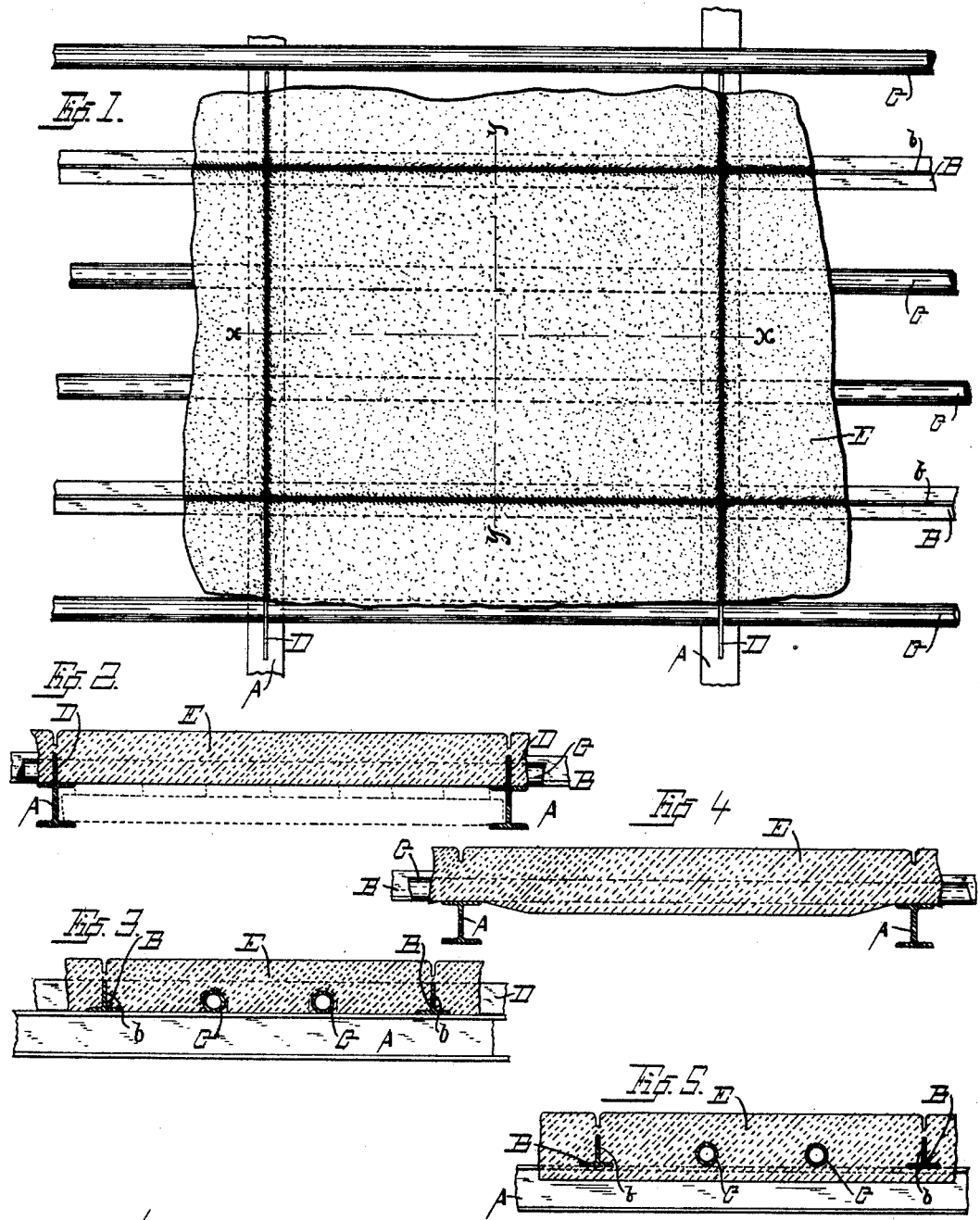

UNITED STATES PATENT OFFICE.

WILLARD P. BECKWITH, OF MILWAUKEE, WISCONSIN.

CEMENT SIDEWALK.

SPECIFICATION forming part of Letters Patent No. 586,540, dated July 20, 1897.

Application filed August 8, 1896. Serial No. 602,113. (No model.)

*To all whom it may concern:*

Be it known that I, WILLARD P. BECKWITH, a citizen of the United States, residing at Milwaukee, in the county of Milwaukee and State of Wisconsin, have invented new and useful Improvements in Cement Sidewalks, of which the following is a specification.

My invention relates to improvements in cement sidewalks.

Heretofore the walks of this class when laid over cellars or other excavations have been constructed upon brick archways supported above the excavation by I-beams; but serious objections to this form of construction are found in the fact that the walk is very heavy and that it is expensive and difficult to construct properly.

The objects of my invention are to cheapen the cost of laying walks of this class and to produce a lighter and neater form of walk.

In the following description reference is had to the accompanying drawings, in which—

Figure 1 is a plan view of my invention with a portion of the cement broken away to show the arrangement of the beams. Figs. 2 and 4 are section views drawn on line $x\ x$ of Fig. 1, the latter showing a slight modification in the thickness of the cement layers. Figs. 3 and 5 are section views drawn on the line $y\ y$ of Fig. 1, the latter showing the same modification illustrated in Fig. 4.

Like parts are identified by the same reference-letters throughout the several views.

In the construction of my walk I prepare a metallic frame, consisting of the I-beams A, the inverted T-irons B, and tubes C, supported transversely on the I-beams, and the bars D, resting on the I-beams between the T-irons with their lower edges cut out or notched where said bars cross the tubes C, as indicated by dotted lines in Fig. 3, and with their upper edges in a horizontal plane with the top of the upward-projecting flange $b$ of the T-iron B.

In laying the cement E a temporary board platform is erected between the I-beams, as indicated by dotted lines in Fig. 2, and the cement is laid upon this platform underneath and around the irons B, the tubes C, and bars D, so as to cover them or inclose them. The upper surface of the cement is then channeled along the lines of the upward-projecting flanges $b$ of the T-irons and along the lines of the bars D, thus marking off the surface of the walk into squares.

It will be observed that the inverted T-irons and the bars D operate as partial partitions, which divide the cement into blocks, with the edges of such blocks resting upon the base-flanges of the T-irons on two sides and upon the upper surface of the I-beams under the bars D on the other two sides. The depth of the channels in the upper surface of the cement is sufficient to nearly reach the partitions, so that only a narrow layer of cement unites the blocks at a point somewhat above the center. The blocks are thus permitted to expand and contract with the changes of temperature and will not crack, except to some extent along the lines of the channels and partitions. After the cement has hardened the platform is removed and the blocks are then supported wholly by the metallic frame, with the edges resting upon the I-beams and upon the base-flanges of the T-irons.

Having thus described my invention, what I claim as new, and desire to secure by Letters Patent, is—

1. A sidewalk comprising a series of beams A, a series of inverted T-irons B resting transversely upon the beams, and a series of cross-bars D running transversely of the T-irons and along the longitudinal center of the I-beams, together with a bed of cement partially partitioned or separated into blocks by the irons B and bars D, with the edges of said blocks supported on the base-flanges of the T-irons and I-beams, substantially as described.

2. A sidewalk, comprising a series of beams A, a series of inverted T-irons B resting transversely upon the beams, tubes C arranged in a parallel position between the T-irons, and cross-bars D resting on the tubes along the longitudinal center of the beams A, together with a bed of cement partially partitioned or separated into blocks by the irons B and bars D, with the edges of said blocks supported on the base-flanges of the T-irons and I-beams, substantially as described.

In testimony whereof I affix my signature in the presence of two witnesses.

WILLARD P. BECKWITH.

Witnesses:
LEVERETT C. WHEELER,
JAS. B. ERWIN.